(12) United States Patent
Pinnegar et al.

(10) Patent No.: US 7,881,501 B2
(45) Date of Patent: Feb. 1, 2011

(54) LOCAL DOMINANT WAVE-VECTOR ANALYSIS OF SEISMIC DATA

(75) Inventors: Charles Robert Pinnegar, Calgary (CA); Pierre Lemire, Calgary (CA); Ryan Kong, Calgary (CA); Doug Bird, Calgary (CA)

(73) Assignee: Calgary Scientific Inc., Calgary, Alberta (CA)

( * ) Notice: Subject to any disclaimer, the term of this patent is extended or adjusted under 35 U.S.C. 154(b) by 1084 days.

(21) Appl. No.: 11/637,760

(22) Filed: Dec. 13, 2006

(65) Prior Publication Data

US 2007/0223788 A1    Sep. 27, 2007

Related U.S. Application Data

(60) Provisional application No. 60/749,638, filed on Dec. 13, 2005.

(51) Int. Cl.
*G06K 9/00* (2006.01)
*G01V 1/00* (2006.01)
*H03F 1/26* (2006.01)

(52) U.S. Cl. .................. 382/109; 367/14; 702/18; 702/189

(58) Field of Classification Search .......... 380/100, 380/109, 197, 253; 333/165, 167; 367/32, 367/9, 14, 73; 702/14, 17, 18, 189, 183, 702/196; 181/108, 113, 122
See application file for complete search history.

(56) References Cited

U.S. PATENT DOCUMENTS

| | | | |
|---|---|---|---|
| 6,446,008 B1 * | 9/2002 | Ozbek ........................... | 702/17 |
| 6,636,810 B1 * | 10/2003 | Moore et al. ................... | 702/17 |
| 6,819,628 B2 * | 11/2004 | Tal-Ezer ....................... | 367/51 |
| 7,379,386 B2 * | 5/2008 | Muyzert et al. ................ | 367/63 |
| 7,401,006 B2 * | 7/2008 | Pinnegar et al. ............. | 702/189 |

* cited by examiner

*Primary Examiner*—Abolfazl Tabatabai
(74) *Attorney, Agent, or Firm*—Freedman & Associates (57) ABSTRACT

The present invention relates to a method and system for processing multi-dimensional signal data to determine frequency dependent features therefrom. The multi-dimensional signal data are transformed into space-frequency or time-space-frequency domain, providing second signal data. At predetermined locations of at least a portion of the one of space and time-space of the second signal data a dominant feature corresponding to a largest value of the second signal data is determined. This is followed by the determination of a wave-vector corresponding to the dominant feature at each of the predetermined locations. Finally, a dip map, a frequency map, and an amplitude map are generated using the wave-vectors. The method and system for processing multi-dimensional signal data to determine frequency dependent features therefrom according to the present invention provide a powerful tool for improved and more detailed evaluation of seismic data using dip, frequency, and amplitude maps, resulting in substantially more accurate geophysical surveys.

29 Claims, 8 Drawing Sheets

LOCAL DOMINANT WAVE-VECTOR ANALYSIS OF SEISMIC DATA

This application claims benefit from U.S. Provisional Patent Application No. 60/749,638 filed Dec. 13, 2005 the entire contents of which are incorporated herein by reference.

FIELD OF THE INVENTION

This invention relates to signal processing and in particular to a signal processing method and system for local dominant wave-vector analysis of seismic data.

BACKGROUND OF THE INVENTION

Interpretation of seismic data, for example, in determining locations of candidate petroleum reservoirs, is typically based on various techniques of visualizing processed seismic sections. Traditionally, two-dimensional (2-D) seismic interpretation is based on a migrated post-stack seismic section—often referred to simply as the seismic section—for visualization. The migrated post-stack seismic section shows amplitudes of fully processed seismic traces as functions of time and Common Depth Point (CDP) position.

With the emergence of three-dimensional (3-D) seismic techniques, the 2-D seismic sections have been largely replaced by 2-D "slices"—horizontal or vertical—through 3-D seismic data. However, like traditional 2-D data, these are likely contaminated by noise during data capture, and are distorted during subsequent data processing, for example, due to "edge effects" introduced by the migration processing step.

While an experienced interpreter of seismic data is able to disregard noise and artifacts, inevitably there arise instances in which subtle features that the interpreter needs to see are obscured. As a consequence, the interpreter is not able to provide sufficient information, for example, about the location of a candidate petroleum reservoir, requiring more seismic investigations, or worse, the interpretation is incorrect. Both scenarios result in substantial additional costs.

It is known in the art that local spectral content—texture—of multi-dimensional signals differs from textures of noise and artifacts. The most commonly used method of spectral representation of an image is the Fourier transform, which describes the content of a signal entirely in frequency domain. Although the Fourier transform is a powerful tool, its lack of positional resolution renders it ill-suited for describing local, or pixel-to-pixel, changes in spectral content of multi-dimensional data.

It would be highly desirable to provide an improved method for processing multi-dimensional signal data to determine frequency dependent features therefrom based on a transform capable of resolving local, or pixel-to-pixel, changes in space or time-space and frequency. It would be further highly beneficial to provide better visualization of the frequency dependent features.

SUMMARY OF THE INVENTION

It is, therefore, an object of the invention to provide a signal processing method and system for processing multi-dimensional signal data to determine frequency dependent features therefrom based on a transform capable of resolving local, or pixel-to-pixel, changes in space or time-space and frequency.

It is further an object of the invention to provide better visualization of the frequency dependent features.

In accordance with the present invention there is provided a method for processing multi-dimensional signal data to determine frequency dependent features therefrom comprising:

a) receiving the multi-dimensional signal data, the multi-dimensional signal data being one of space-dependent data and time-space-dependent data indicative of a characteristic of one of an object and physical event;

b) transforming the multi-dimensional signal data into one of space-frequency and time-space-frequency domain, respectively, providing second signal data;

c) determining at predetermined locations of at least a portion of the one of space and time-space of the second signal data a dominant feature corresponding to a largest value of the second signal data;

d) determining at each of the predetermined locations a wave-vector corresponding to the dominant feature; and, e) determining at each of the predetermined locations data indicative of the frequency dependent features in dependence upon the corresponding dominant wave-vector.

In accordance with the present invention there is further provided a storage medium having stored therein executable commands for execution on a processor, the processor when executing the commands performing:

a) receiving the multi-dimensional signal data, the multi-dimensional signal data being one of space-dependent data and time-space-dependent data indicative of a characteristic of one of an object and physical event;

b) transforming the multi-dimensional signal data into one of space-frequency and time-space-frequency domain, respectively, providing second signal data;

c) determining at predetermined locations of at least a portion of the one of space and time-space of the second signal data a dominant feature corresponding to a largest value of the second signal data;

d) determining at each of the predetermined locations a wave-vector corresponding to the dominant feature; and, e) determining at each of the predetermined locations data indicative of the frequency dependent features in dependence upon the corresponding wave-vector.

In accordance with the present invention there is yet further provided a system for processing multi-dimensional signal data to determine frequency dependent features therefrom comprising:

an input port for receiving the multi-dimensional signal data, the multi-dimensional signal data being one of space-dependent data and time-space-dependent data indicative of a characteristic of one of an object and physical event;

a processor in communication with the input port for:
 a) transforming the multi-dimensional signal data into one of space-frequency and time-space-frequency domain, respectively, providing second signal data;
 b) determining at predetermined locations of at least a portion of the one of space and time-space of the second signal data a dominant feature corresponding to a largest value of the second signal data;
 c) determining at each of the predetermined locations a wave-vector corresponding to the dominant feature; and,
 d) determining at each of the predetermined locations data indicative of the frequency dependent features in dependence upon the corresponding wave-vector;

a storage medium in communication with the processor having stored therein executable commands for execution on the processor, the processor when executing the commands performing at least a portion of a) to d); and, an output port in communication with the processor for providing the data indicative of the frequency dependent features.

In accordance with an aspect of the present invention there is provided a method for processing multi-dimensional signal data to determine frequency dependent features therefrom comprising:

a) receiving the multi-dimensional signal data, the multi-dimensional signal data being one of space-dependent data and time-space-dependent seismic data;
b) transforming the multi-dimensional signal data into one of space-frequency and time-space-frequency domain, respectively, providing second signal data; and,
c) determining at predetermined locations of at least a portion of the one of space and time-space of the second signal data third signal data indicative of the frequency dependent features.

BRIEF DESCRIPTION OF THE FIGURES

Exemplary embodiments of the invention will now be described in conjunction with the following drawings, in which.

DETAILED DESCRIPTION OF THE INVENTION

While the invention will be described based on an implementation using a sparse form of the S-transform, it will become evident to those of skill in the art that is possible to implement the invention using other transforms capable of resolving local changes in space or time-space and frequency. Further, it will become apparent that the invention is not limited for processing seismic data but is applicable in numerous other applications such as image texture analysis.

For the sake of clarity, the basic theory of the S-transform, and particularly the Full Polar S-Transform (FPST), will be described first. A spatial-domain expression of the FPST of a discrete image u(x, y) is:

$$^2S_p(X, Y, f, g) = \sum_{x=0}^{M-1} \sum_{y=0}^{N-1} u(x, y) \exp\left(-\frac{2\pi i f x}{M} - \frac{2\pi i g y}{N}\right) \times \left\{\frac{|fg|}{2\pi} \exp\left(\frac{-(f^2/M^2 + g^2/N^2)[(X-x)^2 + (Y-y)^2]}{2}\right)\right\}, \quad (1)$$

where $^2S_p$ is the FPST, x and y are spatial axes of u, M and N denote the number of columns and rows in u, and f and g denote horizontal and vertical wave-numbers—or frequencies. The Right Hand Side (RHS) of equation (1) resembles U(f,g), the definition of a Discrete Fourier Transform (DFT) of u(x,y), except that the summand includes an extra term—in braces—defining a two-dimensional window whose peak occurs at (X,Y) on the (x,y)-axes. If x and y are, for the moment, considered continuous quantities instead of discrete ones, then any cross-section through this window that passes through (X,Y) gives a one-dimensional Gaussian whose standard deviation is equal to $1/\sqrt{f^2/M^2 + g^2/N^2}$. The window is, therefore, circularly symmetrical, which accounts for the use of "polar" and the suffix P as identifiers. It is noted that the superscript 2 indicates that u(x,y) is two-dimensional. The FPST thus provides a spatially localized Fourier spectrum with a degree of localization being dependent upon a frequency of a Fourier sinusoid considered, i.e. at lower frequencies, larger areas of (x,y) are covered by the window, while smaller areas are retained at higher frequencies.

Due to the presence of f and g in the window term, in addition to x and y, it is not possible to calculate the FPST according to equation (1) using a Fast Fourier Transform (FFT) process. An alternative expression of the FPST that avoids this problem is its frequency-domain form, obtained from equation (1) using the convolution theorem:

$$^2S_p(X, Y, f, g) = \frac{1}{MN} \sum_{\alpha=-M/2}^{M/2-1} \sum_{\beta=-N/2}^{N/2-1} U(\alpha + f, \beta + g) \times \left\{\exp\left(\frac{-2\pi^2(\alpha^2/M^2 + \beta^2/N^2)}{f^2/M^2 + g^2/N^2}\right)\right\} \times \exp\left(\frac{2\pi i \alpha X}{M}\right) \exp\left(\frac{2\pi i \beta Y}{N}\right). \quad (2)$$

Here, U is the DFT of u, α and β have units of frequency, and the term in braces in the RHS is the frequency-domain form of the polar window. It is noted, that the inverse DFT used in equation (2) determines the FPST at all (X,Y) for a given (f,g) wave-vector.

Unfortunately, even for moderately sized images calculating the FPST using equation (2) is very time-consuming on a desktop computer, and the amount of computer memory needed to store results becomes prohibitive for large values of M and N, for example, greater than 100. This problem is addressed in a Sparse Polar S-Transform (SPST) that retains values only at a few locations and at a few frequencies. A general expression of the SPST is obtained by modifying equation (2):

$$^2\hat{S}_p(j, k, f^m, g^m) = \quad (3)$$

$$\frac{1}{MN} \sum_{\alpha=-J(f^m,g^m)/2}^{J(f^m,g^m)/2-1} \sum_{\beta=-K(f^m,g^m)/2}^{K(f^m,g^m)/2-1} U(\alpha + f, \beta + g) \times \left\{\exp\left(\frac{-2\pi^2(\alpha^2/M^2 + \beta^2/N^2)}{f^2/M^2 + g^2/N^2}\right)\right\} \times \exp\left(\frac{2\pi i \alpha j}{J(f^m, g^m)}\right) \exp\left(\frac{2\pi i \beta k}{K(f^m, g^m)}\right).$$

The superscript m on $f^m$ and $g^m$ indicates that the SPST is only being retained for a few (f,g) wave-vectors. The substitution of J and K in place of M and N in the RHS of equation (3) is based on a technique commonly used in multi-rate signal analysis for resampling a signal. Here, at all values of m there is: $J(f^m,g^m)<M$ and $K(f^m,g^m)<N$, which corresponds to down-sampling. Thus, although the new position indices j and k are integers, in most cases a (j,k) position does not correspond to any (X,Y) position, and the actual position of a point (j,k) on the (x,y) axis is given by $(jM/J(f^m,g^m),kN/K(f^m,g^m))$. Using $$J(f^m,g^m)=K(f^m,g^m)=\text{ceil}(C_1\sqrt{(f^m)^2+(g^m)^2}) \quad (4)$$

the values of $f^m$ and $g^m$ are obtained from a sequence $\{s_n\}_{n=0}^{\infty}$, obtained by setting $s_n=0$ and $$s_{n+1} = s_n + \max\left[1, \text{floor}\left(C_2\frac{s_n}{2\pi}\right)\right], \quad (5)$$

resulting in $\{f^m,g^m\}\in\pm\{s_n\}_{n=0}^{\infty}$. In equations (4) and (5), $C_1$ and $C_2$ are user defined constants, set according to meet needs of specific applications, but are normally set to be equal to 1. Thus, the $(f^m,g^m)$ grid is Cartesian, with spacing between rows and between columns increasing with distance from the axes. The same superscript m is used in both coordinates of $(f^m,g^m)$ pairs to generalize to non-Cartesian grids.

At any (X,Y) location considered, the SPST is defined only for a few $(f^m,g^m)$ wave-vectors which change from location to location, i.e. from pixel to pixel. In order to obtain local spectra, missing $(f^m,g^m)$ wave-vectors are determined using an interpolation process. This is performed, for example, by locating (j,k) positions, for which the SPST is defined at a considered $(f^m,g^m)$ wave-vector, closest to a target (X,Y) location, and using interpolation to obtain an approximate value of the SPST at the target (X,Y) location. Supposing that the positions are denoted $j_1<x<j_2$ and $k_1<Y\leq k_2$, and the considered wave-vector is denoted $(f_1^m,g_1^m)$, and using:

$$|^2S_p(j_2,k_1,k_1^m,g_1^m)|=A$$

$$|^2S_p(j_1,k_2,f_1^m,g_1^m)|=B$$

$$|^2S_p(j_2,k_1,f_1^m,g_1^m)|=C$$

$$|^2S_p(j_2,k_2,f_1^m,g_1^m)|=D \quad (6)$$

the following approximation is obtained:

$$|^2S_p(X,Y,f_1^m,g_1^m)| \approx \frac{\alpha+\beta X+\gamma Y+\delta XY}{(j_1-j_2)(k_1-k_2)}, \text{ where} \quad (7)$$

$$\alpha = j_2k_2A - j_2k_1B - j_1k_2C + j_1k_1D,$$

$$\beta = (-k_2A + k_1B + k_2C - k_1D)\frac{J(f_1^m,g_1^m)}{M},$$

$$\gamma = (-j_2A + j_2B + j_1C - j_1D)\frac{K(f_1^m,g_1^m)}{N},$$

$$\delta = (A - B - C + D)\frac{J(f_1^m,g_1^m)K(f_1^m,g_1^m)}{MN}.$$

The above approximation is less accurate than a more complicated polynomial interpolation such as a 16-point cubic polynomial fit. However, this simple interpolation process is sufficiently accurate for determining data for visualization, consuming substantially less processing time using, for example, a desktop computer.

At any location (X, Y), there is a largest value of a space-frequency transform such as the SPST $^2S_p(X, Y, f^m, g^m)$. This feature—called dominant feature—is exploited in the signal processing method and system for local dominant wave-vector analysis according to the invention as described below.

Denoting the wave-vector at which the largest value of the space-frequency transform occurs by $(f_{(X,Y)}^m, g_{(X,Y)}^m)$ it is possible to display the resulting distribution of the dominant feature on the (X,Y) plane the following three ways:

1. Dip map, with arctan $$\left(\frac{g_{(X,Y)}^m/N}{f_{(X,Y)}^m/M}\right)$$

being plotted as a function of (X,Y) resulting in an image showing dip of the dominant feature at each pixel of the (X,Y) plane;

2. Frequency map, with $\sqrt{(f_{(X,Y)}^m)^2/M^2+(g_{(X,Y)}^m)^2/N^2}$ being plotted as a function of (X,Y) resulting in an image showing frequency of the dominant feature at each pixel of the (X,Y) plane; and, 3. Amplitude map, with $|S(X,Y,f_{(X,Y)}^m,g_{(X,Y)}^m)|$ being plotted as a function of (X, Y) resulting in an image showing amplitude of the dominant feature at each pixel of the (X,Y) plane.

Visualization of the dominant feature using one of the above three maps is advantageous in revealing even subtle pixel-to-pixel changes in spectral content of multi-dimensional data, as will become apparent from the example below.

One disadvantage of these representations is that $f_{(X,Y)}^m$ and $g_{(X,Y)}^m$ are integer values limiting the above maps to limited sets of values. This is addressed by taking advantage of the uncertainty principle due to which any peak that occurs at $(f_{(X,Y)}^m, g_{(X,Y)}^m)$ is likely to experience amplitude "smearing" into the two adjacent $f^m$ positions at the same value of $g^m$. A simple quadratic interpolation provides a substantially better approximation of the "real" f-position of the peak. Similarly, interpolation in the $g^m$ direction provides an improved g-position of the peak. Combining the two quadratic interpolations with the known amplitudes of the five points in $(f^m, g^m)$-space results in a simple five-point interpolation of the amplitude at the (f,g) peak position.

Furthermore, secondary peaks having lower amplitude than the primary peaks are determined using, for example, a "quad-tree" process, in which all wave-vectors for which the space-frequency transform has local maxima in $(f^m,g^m)$-space are identified as being peaks. Generally, this process is of O(MN), but since retention of very low amplitude peaks is often undesired an amplitude threshold is applied at each location (X,Y) to reduce computing time. A further reduction of computing time is achieved by disregarding pixels adjacent to identified peaks since it is not possible that these are peaks themselves. The locations and amplitudes of the sets of peaks at each pixel are then used, for example, to categorize pixels based on local textural attributes.

As is evident, it is possible to extend the above data processing to three-dimensional data u(x,y,z), to obtain dip, frequency, and amplitude volumes analogous to the above maps. However, for most practical applications the processing of three-dimensional data requires prohibitive large computer memory as well as long computing time. To reduce the requirements for computer memory and computing time u(x, y,z) is, for example, divided into two-dimensional "slices" through selected values of x, y, and z and then the two dimensional space-frequency transform of each of the slices is calculated. For example, the SPST of a slice through a selected z value is expressed as $^2S_p(j,k,z,f^m,g^m)$ with the original z dimension remaining in the argument list, since no decimation has been performed in the z direction. With denoting a frequency index corresponding to the spatial direction z by h, a window position on the z-axis by Z, and a sparse index in the z-direction analogous to j and k by l, the analogous SPSTs of the data slices through selected values of y and x have the forms $^2S_p(j, y,l,f^m,h^m)$ and $^2S_p(x,k,l,f^m,h^m)$. From these SPSTs, $^2S_p(X,Y,z,f_{(X,Y)}{}^m, g_{(X,Y)}{}^m)$, $^2S_p(X, y, Z, f_{(X,Z)}{}^m, h_{(X,Z)}{}^m)$, $^2S_p(x, Y, Z, g_{(Y,Z)}{}^m, h_{(Y,Z)}{}^m)$ are then determined to provide dip, frequency, and amplitude volumes.

Figure 1A:
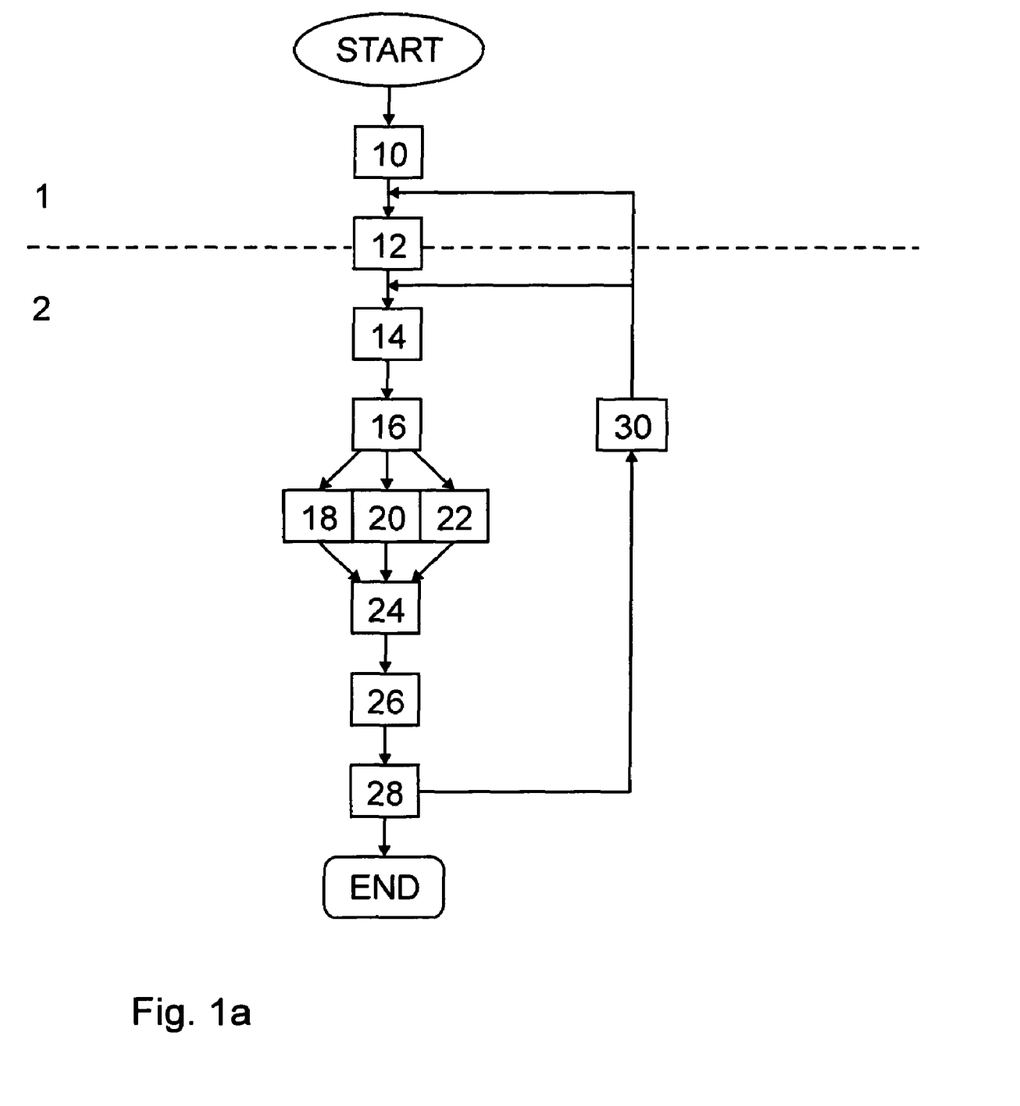
FIGS. 1a to 1d are simplified flow diagrams illustrating various embodiments of a method for processing multi-dimensional signal data according to the invention.

Referring to FIG. 1a, a simplified flow diagram of a first embodiment of a method for processing multi-dimensional signal data to determine frequency dependent features therefrom according to the invention is shown. The multi-dimensional signal data received for processing—box 10—comprise, for example, two- or three-dimensional data indicative of a characteristic of an object or physical event. Such data are, for example, seismic data—seismic sections—indicative of structural features in the ground of an investigated area as will be shown in an example below. The multi-dimensional data are space-dependent, i.e. the signal data are dependent upon two or three space coordinates or, alternatively, time-space-dependent, i.e. the signal data are dependent upon time and one or two space coordinates. As will become evident to those of skill in the art, the method for processing multi-dimensional signal data according to the invention is not limited to seismic data, but is beneficial for extracting frequency dependent features in numerous other applications such as image texture analysis. The multi-dimensional signal data are then transformed from space-domain or time-space-domain 1 into space-frequency or time-space-frequency-domain 2, respectively, providing second signal data—box 12. The transformation is performed using, for example, the SPST as outlined above. Alternatively, a different transformation is employed such as S-transform, Gabor transform, Curvelet transform, Contourlet transform, Ridgelet transform, or Beamlet transform, depending, for example, on properties of the multi-dimensional data to be transformed and localization properties of the transform. After transformation, the second signal data are processed to determine at predetermined locations of at least a portion of the space or time-space of the second signal data a dominant feature corresponding to a largest value of the second signal data at a respective predetermined location—box 14. For example, the predetermined locations correspond to locations of image pixels. The second signal data are then processed—box 16—to determine at each of the predetermined locations a wave-vector corresponding to the dominant feature. Using the wave-vector, data indicative of dip 18, frequency 20, and amplitude 22 of the dominant feature are determined at each predetermined location. Referring to box 24, plotting data are then determined from the data indicative of the dip 18, the frequency 20, and the amplitude 22 of the dominant features for plotting the dip, frequency, and amplitude of the dominant features as a function of space or time-space of the multi-dimensional data. Preferably using a graphical display, the plotting data are then displayed—box 26—enabling a user to extract frequency dependent information from dip, frequency, and amplitude maps—2D—or from dip, frequency, and amplitude volumes—3D. Further preferably, user interaction—box 28—is enabled in order to control the signal processing—box 30—such as selecting portions of the multi-dimensional data to be processed.

Optionally, processing of the second signal data—boxes 14 to 22—is performed for determining secondary features instead of the local dominant feature.

Figure 1B:
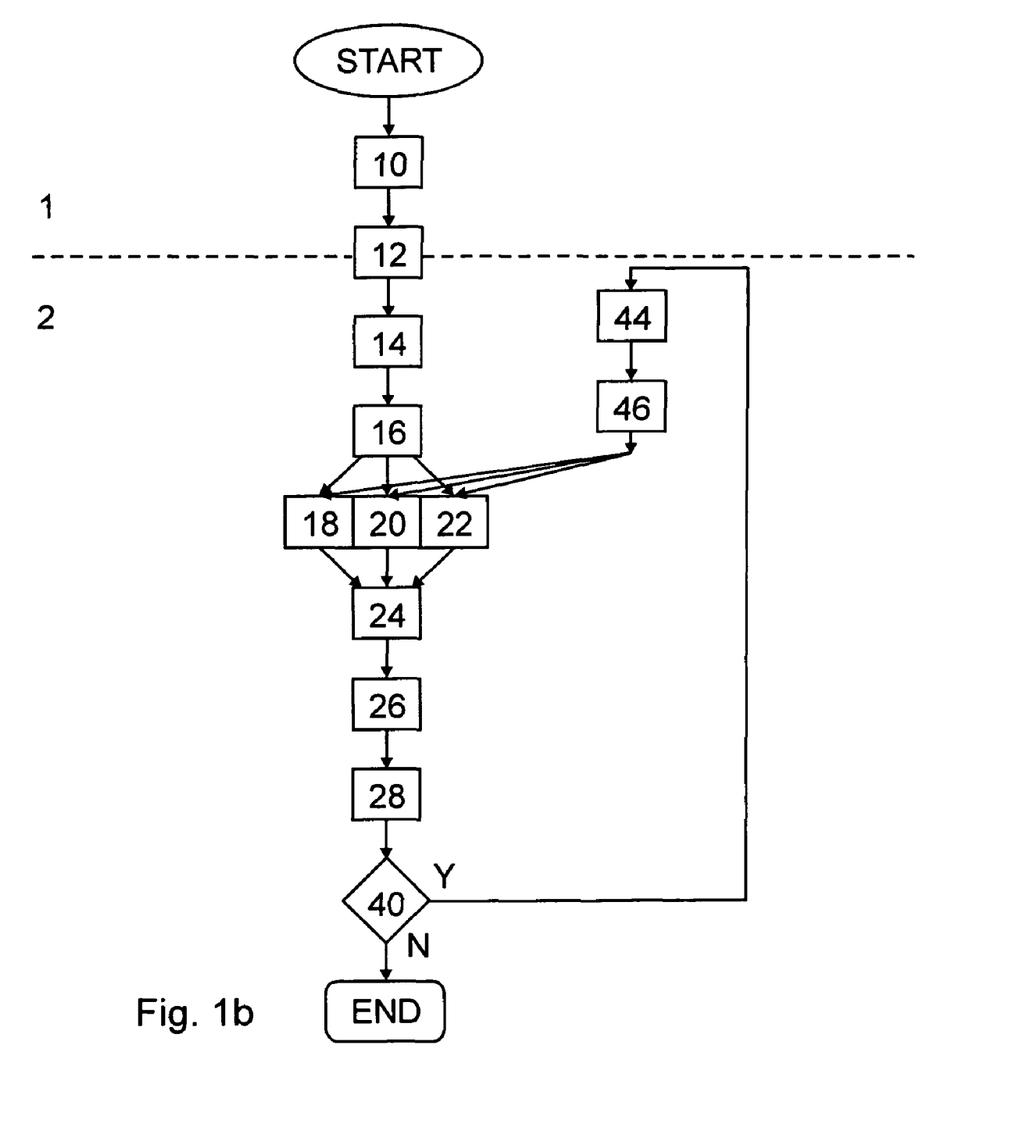
Figure 1C:
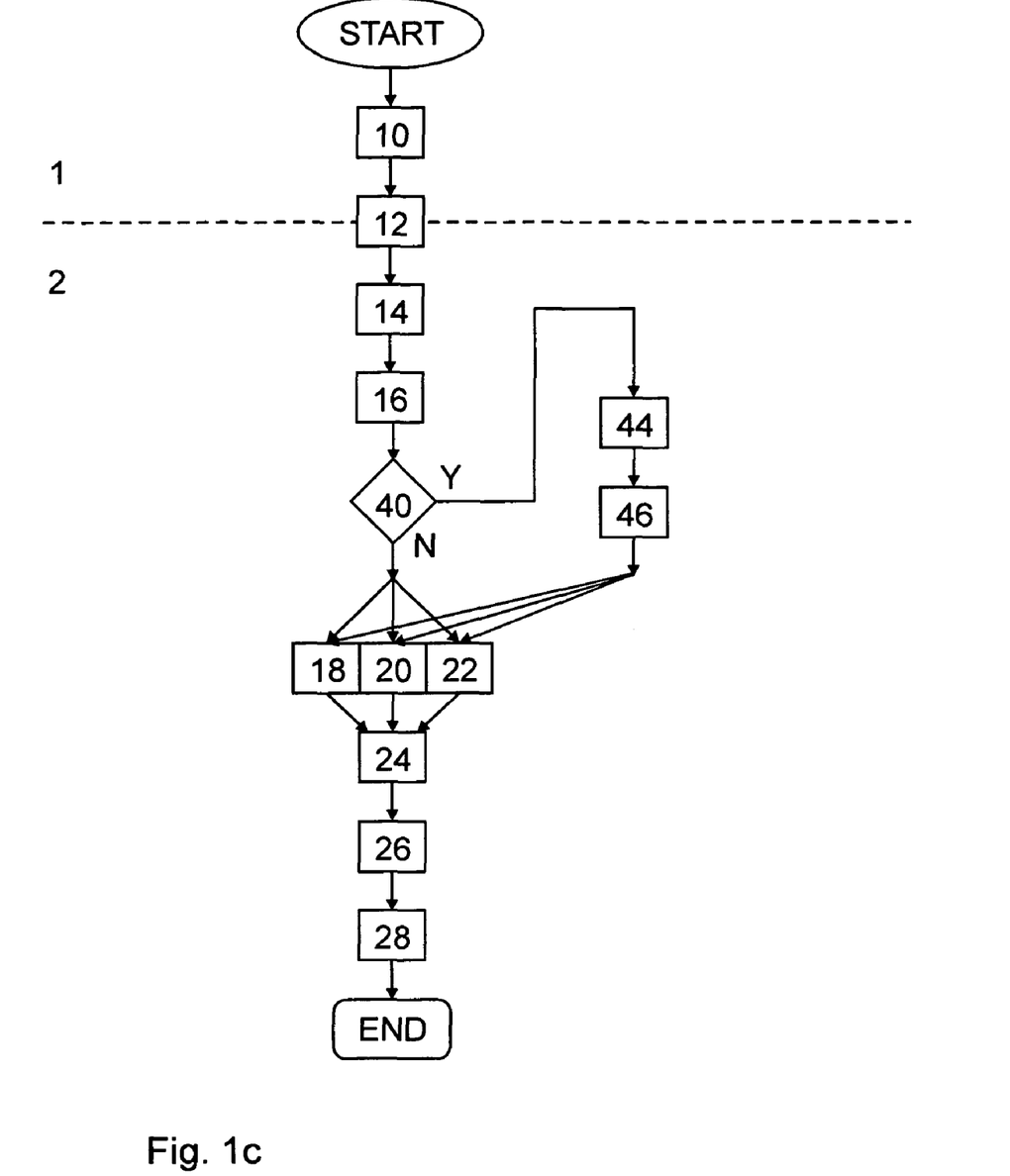

Referring to FIG. 1b, a simplified flow diagram of a second embodiment of a method for processing multi-dimensional signal data to determine frequency dependent features therefrom according to the invention is shown. Here, the determination of secondary features is integrated into the method shown in FIG. 1a to replace the dominant feature at locations where the same is determined to be indicative of noise or an artifact. For simplicity, same reference numerals are used for same processing steps. Referring to box 40, a user determines if at a location the dominant feature is indicative of noise or an artifact. At such a location secondary features are determined corresponding to peak values smaller than the largest value of the second signal data—box 44. At each of these locations a wave-vector corresponding to the secondary features is determined—box 46—for replacing the wave-vector corresponding to the dominant feature in the following processing steps. Optionally, the secondary features are enhanced for proper visualization. Alternatively, the determination of a dominant feature at a location for being indicative of noise or an artifact—box 40—is performed by the processor, as shown in FIG. 1c. For example, if frequencies of noise or artifacts are known it is possible to use the processor for detecting wave-vectors corresponding to dominant features indicative of noise or an artifact. If this is the case, the secondary feature and its wave-vector are determined—boxes 44 and 46—for replacing the wave-vector corresponding to the dominant feature in the following processing steps.

Figure 1D:
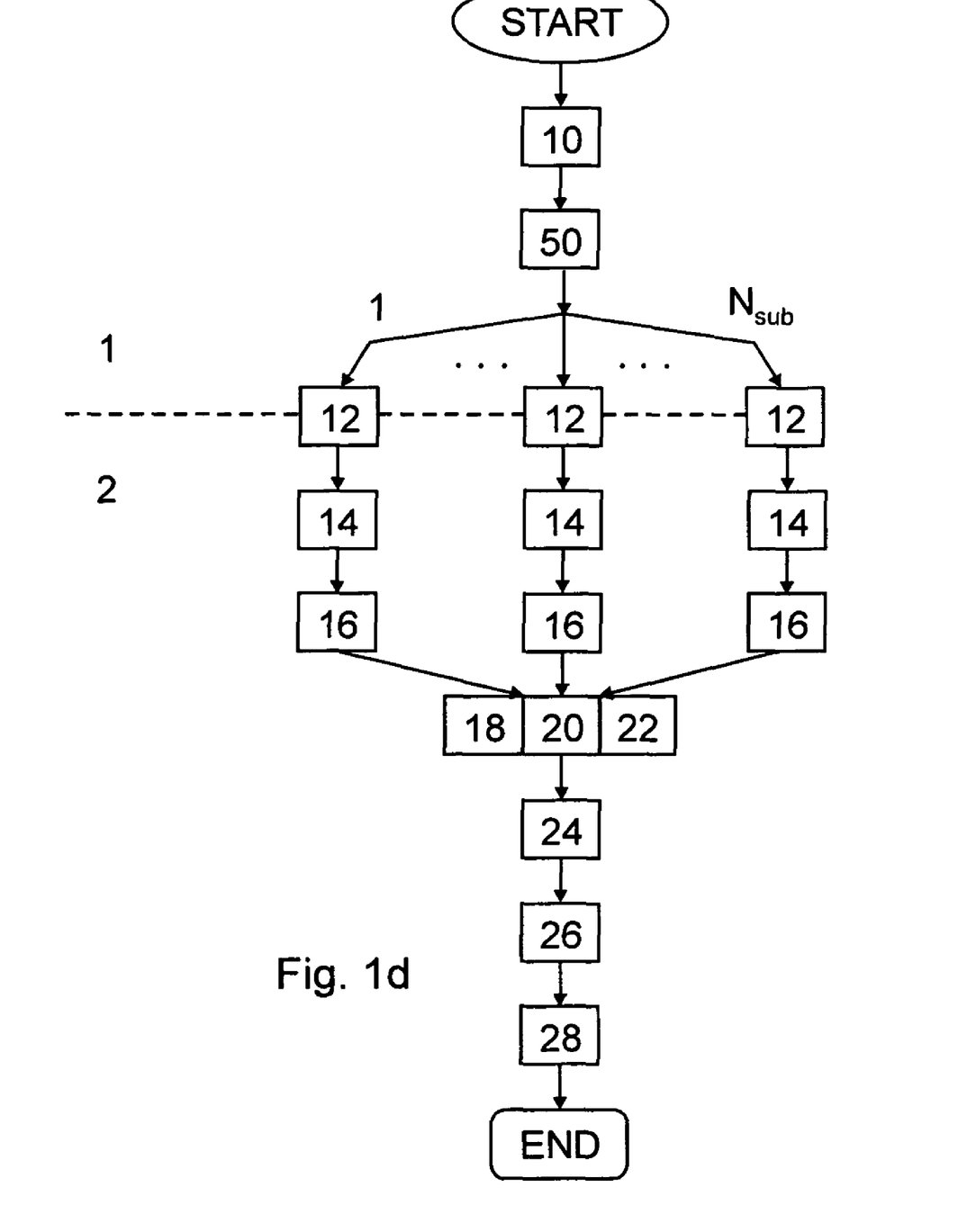

Referring to FIG. 1d, a third embodiment of a method for processing multi-dimensional signal data to determine frequency dependent features therefrom according to the invention is shown. Here, the received multi-dimensional data are three-dimensional—or higher. For simplicity, same reference numerals as in FIG. 1a are used for same processing steps. To reduce the requirements for computer memory and computing time it is possible, as outlined above, to divide the three-dimensional data into $N_{Sub}$ two-dimensional "slices"—or sub-sections—through selected values of x, y, and z—box 50—and then to calculate the two dimensional space-frequency or time-space-frequency transform of each of the slices—box 12. The signal processing according to the boxes 14 and 16 are performed for each of the "slices". Based on the wave-vectors of the $N_{Sub}$ "slices" dip, frequency, and amplitude are then determined to provide dip, frequency, and amplitude volumes.

Obviously, the various embodiments of the method for processing multi-dimensional signal data to determine frequency dependent features therefrom according to the invention outlined above are easily combined in various fashions in order to satisfy specific needs in different applications.

Figure 2:
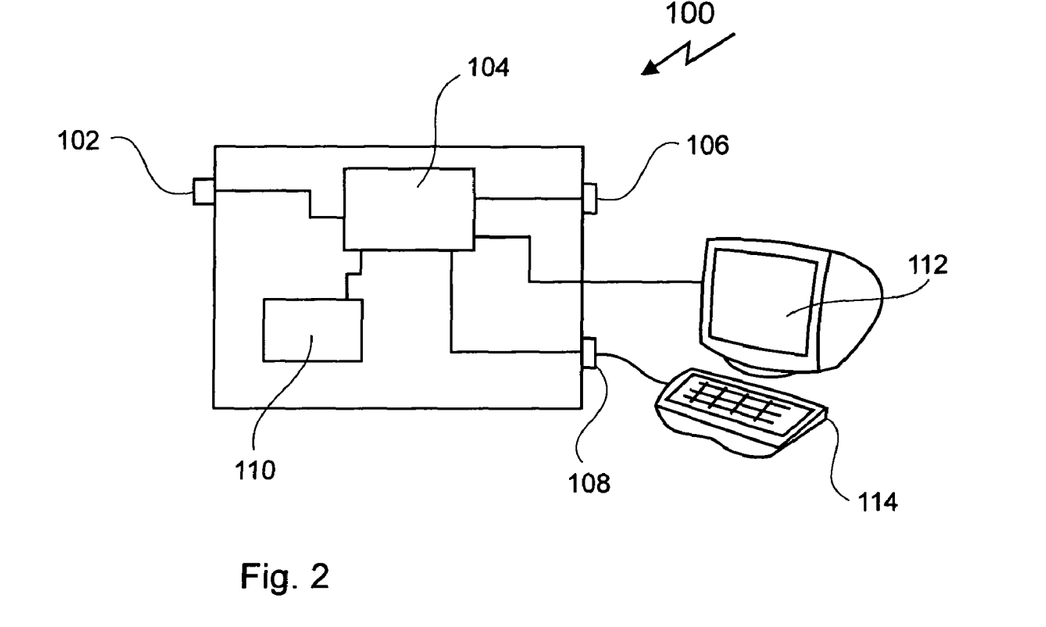
FIG. 2 is a simplified block diagram illustrating a system for signal processing using the methods shown in FIGS. 1a to 1d according to the invention.

Referring to FIG. 2, a signal processing system 100 according to the invention for implementing the above signal processing methods is shown. Multi-dimensional signal data are received at input port 102. Using electronic circuitry such as a processor 104 the signal data are then digitally processed. The system 100 comprises a storage medium 110 having stored therein executable commands for execution on the processor 104 for performing the signal processing corresponding to the above signal processing methods. Alternatively, the processor 104 comprises electronic circuitry designed for performing at least a portion of the signal processing in a hardware implemented fashion. The system 100 further comprises an output port 106 for providing the processed signal data for storage or further processing. The signal processing is controlled by a user viewing, for example, a graphical representation of the signal data and data determined during signal processing steps on display 112, and by providing control commands via port 108—connected, for example, to a keyboard 114—to the processor 104. Preferably, the display 112 is a graphical user interface facilitating user interaction during signal processing.

Figure 3:
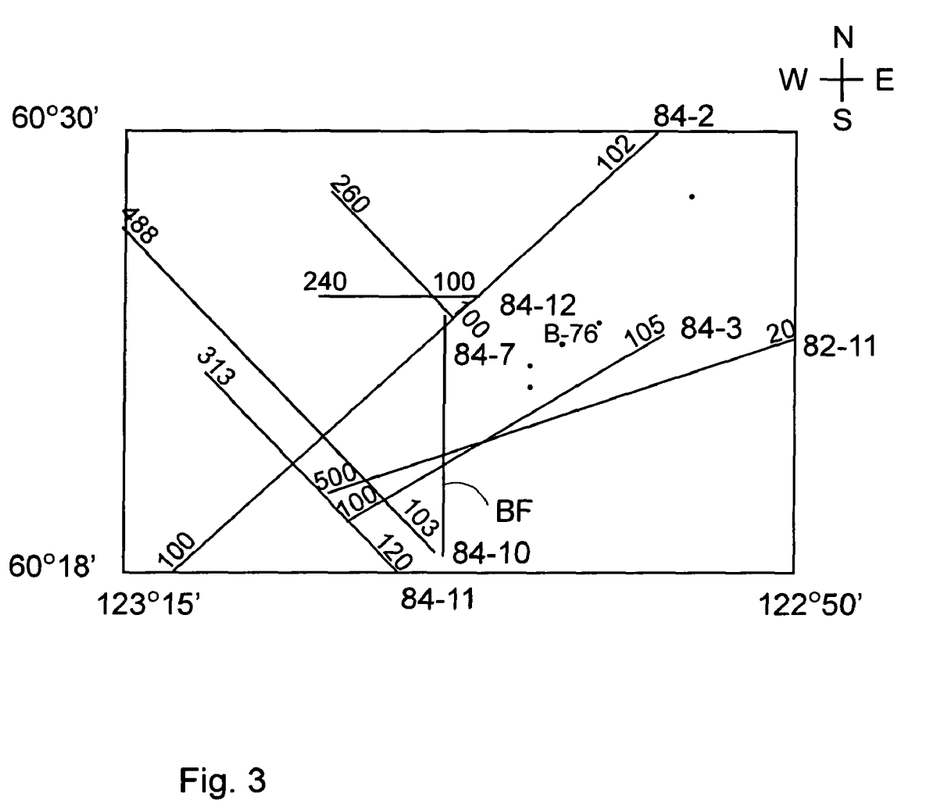
FIG. 3 is a diagram illustrating a seismic survey base map.

FIG. 3 illustrates a survey base map of a survey conducted in the Arrowhead region of the Northwest Territories. The seismic data were collected along seven seismic lines in a 20 km 2 area at the north end of the Liard Basin. The study area ranges from latitudes 60°1' N to 60°3' N and from longitudes 122°50' W to 123°15' W. In this region, the oil producing rocks are sandstones from the Cretaceous period interbedded with shales and siltstones, referred to as the Fort St. John Group. These strata thicken rapidly towards the north end of the Liard Basin. There are two unconformities within this region, with the eastern part being uplifted. Three of the seven seismic lines intersect the Bovie Fault BF, a high-angle thrust fault that is the result of contraction of the basin. Initially, the Bovie fault itself was considered a potential structural trap for hydrocarbons, but subsequent exploration failed to locate any reservoirs in the vicinity of the fault. However, natural gas has been recovered from a layer of sandstone in a part of the Fort St. John Group located to the east of the Bovie fault—producing well B-76. The trapping mechanism is believed to be stratigraphic pinch out, with the trap being composed of overlying and underlying shales that are impermeable to natural gas.

Figure 4A:
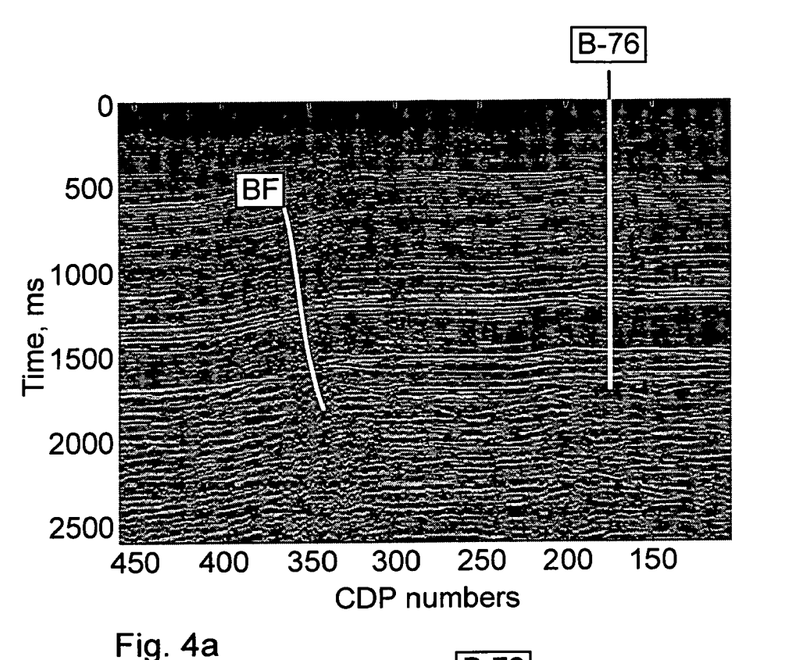
FIG. 4a is a diagram illustrating a seismic section for seismic line 84-3 indicated in FIG. 3; and, FIGS. 4b to 4d are diagrams illustrating a dip map, a frequency map, and an amplitude map, respectively, of the seismic section shown in FIG. 4a, produced using the method for processing multi-dimensional signal data according to the invention.

FIG. 4a shows the two-dimensional time-space seismic data collected along the seismic line 84-3. The left and right hand sides of FIG. 4a correspond to the southwestern and northeastern ends of the seismic line, respectively. The X-axis denotes CDP position and the Y-axis denotes two-way seismic travel time in ms. The location of the Bovie fault is marked in the diagram of FIG. 4a, as well as the position on the seismic line 84-3 closest to the producing well B-76. Since the perpendicular distance from B-76 to the plane of the seismic data is only about 2 km, see FIG. 3, the signature of the B-76 reservoir should be manifested in the diagram of FIG. 4a if the reservoir is large enough. Three holes drilled near B-76—indicated by stars in FIG. 3—failed to strike gas, which indicates a limited southwest-northeast extent of the reservoir, but does not rule out the possibility of the reservoir having an irregular shape, such as a channel shape.

Figure 4B:
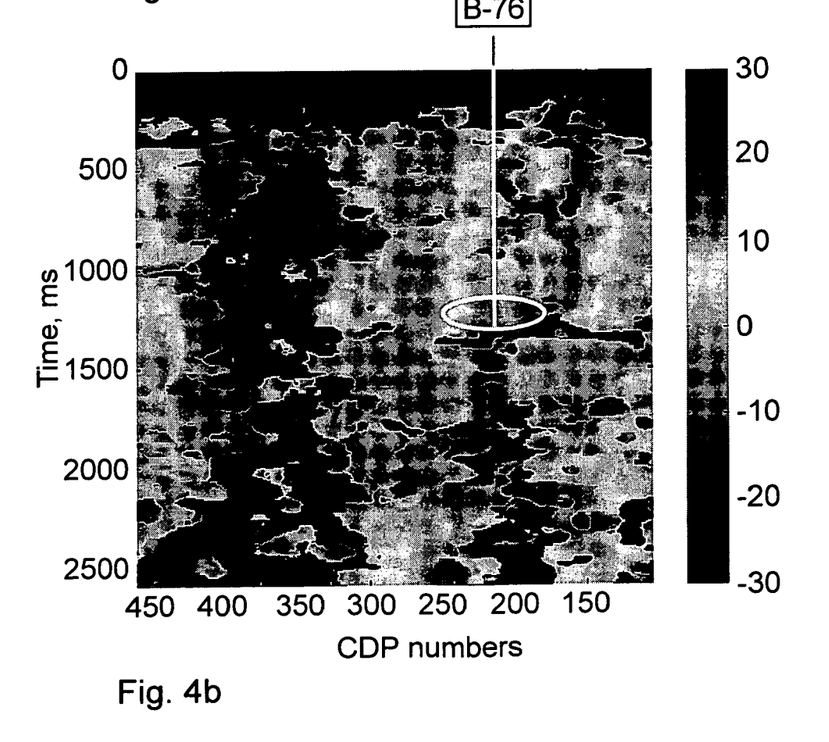

FIG. 4b illustrates a dip map obtained from the data shown in FIG. 4a. Since the X-axis of FIG. 4a has units of distance while the Y-axis has units of time, the $k_x$-axis of its Fourier representation has units of inverse length while the $k_y$-axis has units of frequency. Therefore, FIG. 4b does not show a map of true dip, because the horizontal and vertical extent of each pixel have different meanings. However, it is possible to use the above method to produce a map of apparent dip giving an indication of relative values of the dip angle. Here, the gray scale indicates apparent dip with light gray indicating horizontal layering. The tilted rock layers close to the Bovie fault, visible in FIG. 4a as a "left-leaning" region comprising approximately CDP positions 425 through 325, is indicated in FIG. 4b as a large signature of high dip. Minor folding of the rock layers is indicated by the cyclic transitions in the rest of FIG. 4b. Of greater interest is the marked region near t=1200 ms to t=1300 ms. Moving from left to right through this area, the dip of the dominant wave-vector increases from horizontal to strongly left-leaning, decreases through the horizontal, and becomes strongly right-leaning before returning again to horizontal. This indicates a small anticline structure—barely visible in FIG. 3—that is likely part of the producing reservoir.

Figure 4C:
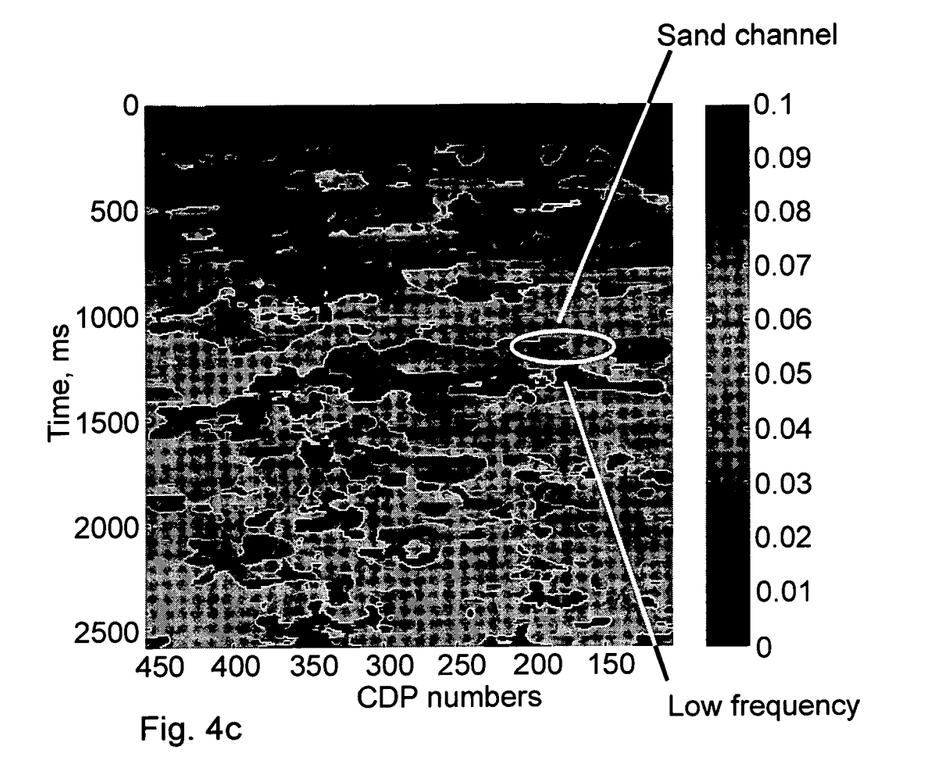

FIG. 4c illustrates a frequency map—or map of apparent texture—obtained from the data shown in FIG. 4a, with the assumption that the horizontal and vertical extents of each pixel represent the same—dimensionless—physical quantity. The unit of "texture" is the inverse of the pixel dimensions, thus the Nyquist frequency is 0.5 along both axes. FIG. 4c shows a concentration of higher frequencies at shallower depths, and lower frequencies at greater depths. This transition is gradual and due to seismic attenuation. However, the isolated dark region near 1400 ms at CDP positions 250 through 150, has a different interpretation. Higher frequencies are known to experience a rapid decrease in amplitude after passing through natural gas, therefore, seismic energy reflected from rock layers lying just below a natural gas reservoir tend to comprise predominantly low frequencies. It is likely that these low-frequency zones indicate the location of the shales underlying the reservoir. It is noted, that in case information about seismic velocities of the various rock layers is available—obtained, for example, using borehole geophysical techniques—and the spacing between CDP positions is accounted for, it is possible to convert apparent dip and texture maps into maps of true dip and texture.

Figure 4D:
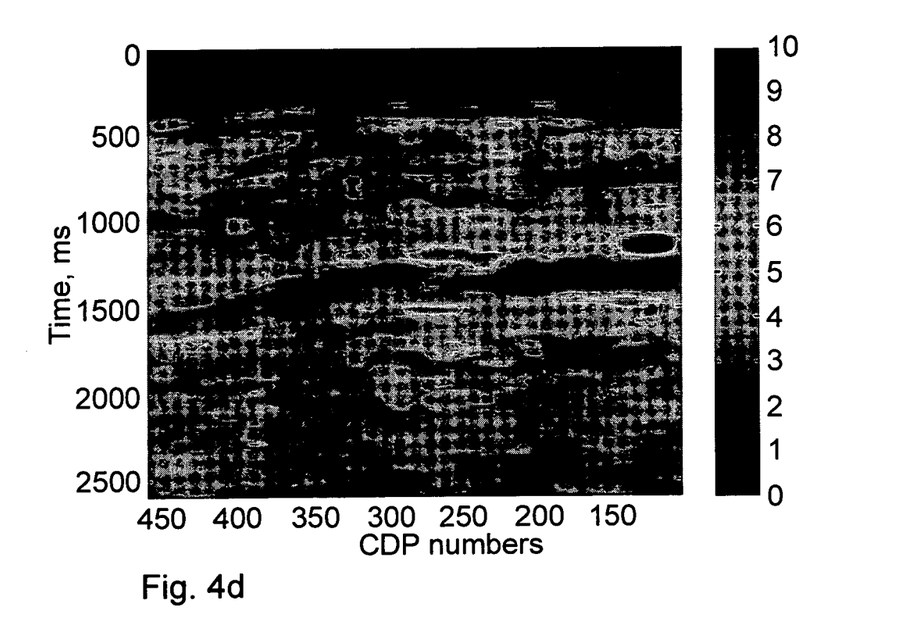

It is obvious that the peaks of the amplitude map of seismic line 84-03 shown in FIG. 4d coincide with the brightest reflections on the seismic section shown in FIG. 4a. Large seismic amplitudes are produced by large reflections from interfaces between rock layers with different densities and different seismic velocities. The amplitude map shown in FIG. 4d provides additional information about the main seismic horizons in the seismic data and the positions of anomalies on the seismic section.

The method and system for processing multi-dimensional signal data according to the invention is highly beneficial for the evaluation of multi-dimensional data based on frequency dependent features. As shown in the example above, the signal processing according to the invention provides a powerful tool for improved and more detailed evaluation of seismic data using dip, frequency, and amplitude maps, resulting in substantially more accurate geological surveys. Furthermore, it is possible to adapt the method and system for processing multi-dimensional signal data according to the invention for numerous other applications such as image texture analysis.

Numerous other embodiments of the invention will be apparent to persons skilled in the art without departing from the spirit and scope of the invention as defined in the appended claims.

What is claimed is:

1. A method for processing multi-dimensional signal data to determine frequency dependent features therefrom comprising:

a) receiving the multi-dimensional signal data, the multi-dimensional signal data being one of space-dependent data and time-space-dependent data indicative of a characteristic of one of an object and physical event;

b) transforming the multi-dimensional signal data into one of space-frequency and time-space-frequency domain, respectively, providing second signal data;

c) determining at predetermined locations of at least a portion of the one of space and time-space of the second signal data a dominant feature corresponding to a largest value of the second signal data;

d) determining at each of the predetermined locations a wave-vector corresponding to the dominant feature; and, e) determining at each of the predetermined locations data indicative of the frequency dependent features in dependence upon the corresponding wave-vector.

2. A method for processing multi-dimensional signal data to determine frequency dependent features therefrom as defined in claim 1 wherein the multi-dimensional data comprise one of two-dimensional data and three-dimensional data.

3. A method for processing multi-dimensional signal data to determine frequency dependent features therefrom as defined in claim 2 wherein the multi-dimensional data are seismic data.

4. A method for processing multi-dimensional signal data to determine frequency dependent features therefrom as defined in claim 2 wherein the predetermined locations correspond to pixels of the multi-dimensional data.

5. A method for processing multi-dimensional signal data to determine frequency dependent features therefrom as defined in claim 1 wherein e) comprises determining at least one of dip, frequency, and amplitude of the dominant feature.

6. A method for processing multi-dimensional signal data to determine frequency dependent features therefrom as defined in claim 5 comprising determining plotting data for plotting the at least one of dip, frequency, and amplitude of the dominant feature as a function of one of the space and the time-space of the multi-dimensional signal data.

7. A method for processing multi-dimensional signal data to determine frequency dependent features therefrom as defined in claim 6 comprising graphically displaying the plotting data.

8. A method for processing multi-dimensional signal data to determine frequency dependent features therefrom as defined in claim 5 wherein the plotting data comprise control data for enabling user interaction.

9. A method for processing multi-dimensional signal data to determine frequency dependent features therefrom as defined in claim 1 wherein b) the multi-dimensional signal data are transformed using one of S-transform, sparse polar S-transform, Gabor transform, Curvelet transform, Contourlet transform, Ridgelet transform, and Beamlet transform.

10. A method for processing multi-dimensional signal data to determine frequency dependent features therefrom as defined in claim 1 wherein c) the dominant feature is determined using interpolation.

11. A method for processing multi-dimensional signal data to determine frequency dependent features therefrom as defined in claim 10 wherein the interpolation comprises a five-point interpolation in the frequency domain.

12. A method for processing multi-dimensional signal data to determine frequency dependent features therefrom as defined in claim 1 comprising:
   c1) determining at predetermined locations secondary features corresponding to peak values smaller than the largest value of the second signal data;
   d1) determining at each of the predetermined locations a wave-vector corresponding to each of the secondary features; and,
   e1) determining at each of the predetermined locations data indicative of the frequency dependent features in dependence upon the corresponding wave-vector.

13. A method for processing multi-dimensional signal data to determine frequency dependent features therefrom as defined in claim 12 comprising omitting peak values below a predetermined threshold.

14. A method for processing multi-dimensional signal data to determine frequency dependent features therefrom as defined in claim 12 comprising determining at least a predetermined location if the dominant feature is indicative of one of noise and an artifact.

15. A method for processing multi-dimensional signal data to determine frequency dependent features therefrom as defined in claim 14 comprising enhancing secondary features at the at least a predetermined location if the dominant feature is indicative of one of noise and an artifact.

16. A method for processing multi-dimensional signal data to determine frequency dependent features therefrom as defined in claim 1 wherein the multi-dimensional signal data are three-dimensional data comprising determining a plurality of two-dimensional data subsets and performing b) to d) for each of the plurality of subsets.

17. A method for processing multi-dimensional signal data to determine frequency dependent features therefrom as defined in claim 16 comprising determining at least one of dip, frequency, and amplitude in dependence upon the plurality of two-dimensional data subsets.

18. A non-transitory computer storage medium having stored therein executable commands for execution on a processor, the processor when executing the commands performing:
   a) receiving the multi-dimensional signal data, the multi-dimensional signal data being one of space-dependent data and time-space-dependent data indicative of a characteristic of one of an object and physical event;
   b) transforming the multi-dimensional signal data into one of space-frequency and time-space-frequency domain, respectively, providing second signal data;
   c) determining at predetermined locations of at least a portion of the one of space and time-space of the second signal data a dominant feature corresponding to a largest value of the second signal data;
   d) determining at each of the predetermined locations a wave-vector corresponding to the dominant feature; and,
   e) determining at each of the predetermined locations data indicative of the frequency dependent features in dependence upon the corresponding wave-vector.

19. A non-transitory computer storage medium as defined in claim 18 having stored therein executable commands for execution on a processor, the processor when executing the commands performing:
   determining at least one of dip, frequency, and amplitude of the dominant feature.

20. A non-transitory computer storage medium as defined in claim 19 having stored therein executable commands for execution on a processor, the processor when executing the commands performing:
   determining plotting data for plotting the at least one of dip, frequency, and amplitude of the dominant feature as a function of one of the space and the time-space of the multi-dimensional signal data.

21. A non-transitory computer storage medium as defined in claim 18 having stored therein executable commands for execution on a processor, the processor when executing the commands performing:
   c1) determining at predetermined locations secondary features corresponding to peak values smaller than the largest value of the second signal data;
   d1) determining at each of the predetermined locations a wave-vector corresponding to each of the secondary features; and,
   e1) determining at each of the predetermined locations data indicative of the frequency dependent features in dependence upon the corresponding wave-vector.

22. A non-transitory computer storage medium as defined in claim 21 having stored therein executable commands for execution on a processor, the processor when executing the commands performing:
   enhancing secondary features at the at least a predetermined location if the dominant feature is indicative of one of noise and an artifact.

23. A non-transitory computer storage medium as defined in claim 22 having stored therein executable commands for execution on a processor, the processor when executing the commands performing:

determining at least a predetermined location if the dominant feature is indicative of one of noise and an artifact.

24. A non-transitory computer storage medium as defined in claim 18 having stored therein executable commands for execution on a processor, the processor when executing the commands performing:

determining a plurality of two-dimensional data subsets and performing b) to d) for each of the plurality of subsets; and, determining at least one of dip, frequency, and amplitude in dependence upon the plurality of two-dimensional data subsets.

25. A system for processing multi-dimensional signal data to determine frequency dependent features therefrom comprising:

an input port for receiving the multi-dimensional signal data, the multi-dimensional signal data being one of space-dependent data and time-space-dependent data indicative of a characteristic of one of an object and physical event;

a processor in communication with the input port for:

a) transforming the multi-dimensional signal data into one of space-frequency and time-space-frequency domain, respectively, providing second signal data;

b) determining at predetermined locations of at least a portion of the one of space and time-space of the second signal data a dominant feature corresponding to a largest value of the second signal data;

c) determining at each of the predetermined locations a wave-vector corresponding to the dominant feature; and, d) determining at each of the predetermined locations data indicative of the frequency dependent features in dependence upon the corresponding wave-vector;

a storage medium in communication with the processor having stored therein executable commands for execution on the processor, the processor when executing the commands performing at least a portion of a) to d); and, an output port in communication with the processor for providing the data indicative of the frequency dependent features.

26. A system for processing multi-dimensional signal data to determine frequency dependent features therefrom as defined in claim 25 wherein the processor comprises electronic circuitry designed for performing at least a portion of a) to d).

27. A system for processing multi-dimensional signal data to determine frequency dependent features therefrom as defined in claim 25 comprising a control port in communication with the processor for receiving control commands for controlling at least a portion of a) to d).

28. A system for processing multi-dimensional signal data to determine frequency dependent features therefrom as defined in claim 25 comprising a graphical display in communication with the processor for displaying the data indicative of the frequency dependent features in a graphical fashion.

29. A system for processing signal data to determine polarization dependent features therefrom as defined in claim 28 wherein the graphical display comprises a graphical user interface.

* * * * *